UNITED STATES PATENT OFFICE.

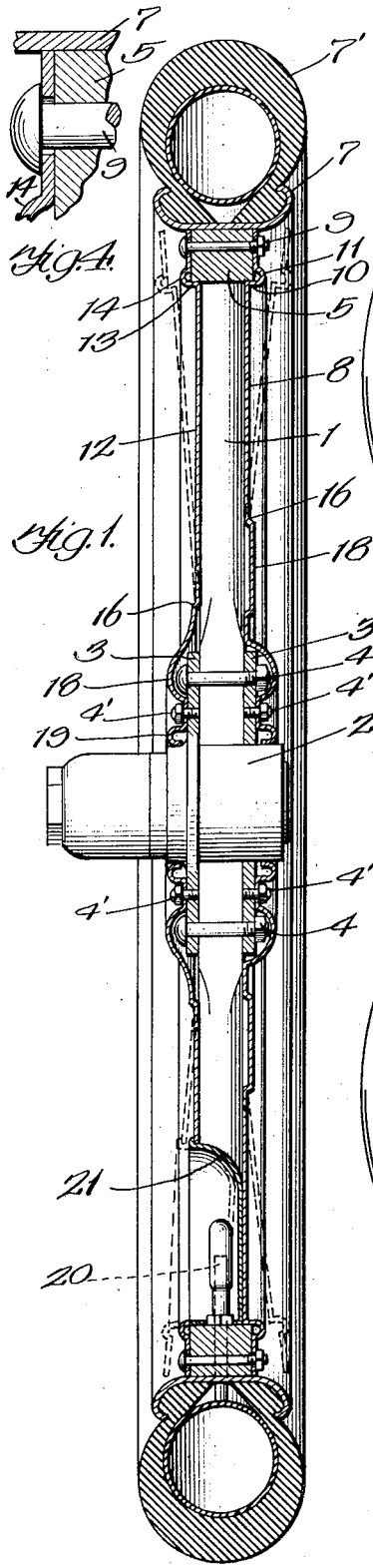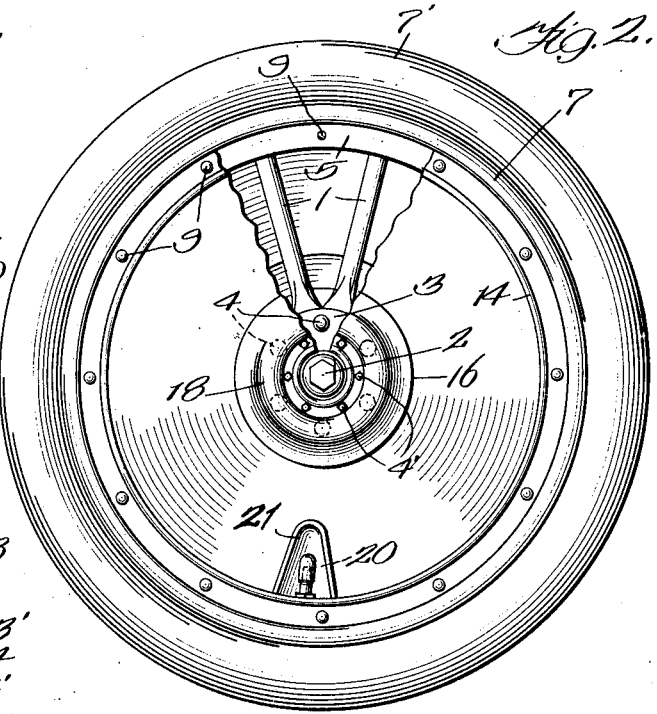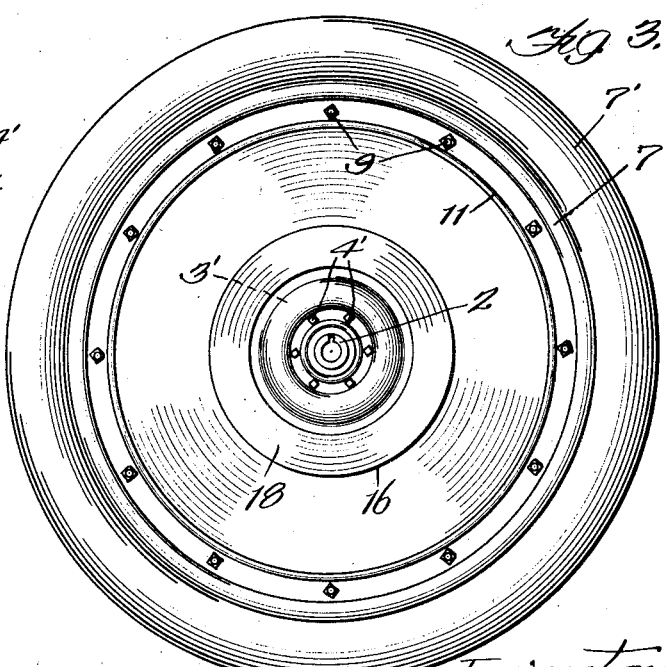

FREDERICK S. STAFFORD, OF CHICAGO, ILLINOIS, ASSIGNOR TO HENRY G. SAAL, OF CHICAGO, ILLINOIS.

WHEEL.

1,392,367.   Specification of Letters Patent.   Patented Oct. 4, 1921.

Application filed December 5, 1919. Serial No. 342,644.

*To all whom it may concern:*

Be it known that I, FREDERICK S. STAFFORD, citizen of the United States, residing at Chicago, in the county of Cook and State of Illinois, have invented a certain new and useful Improvement in Wheels, of which the following is a full, clear, concise, and exact description.

My invention relates to wheels and is of particular service in the formation of vehicle wheels employed in the manufacture and reconstruction of motor vehicles though the invention is not to be limited in its use.

In carrying out certain characteristics of my invention I employ a metal disk formed with a peripheral shoulder upon its inner face, this shoulder being surrounded and engaged by the wheel rim or the felly portion of such rim if the wheel happens to carry a pneumatic or other tire. This shoulder is preferably formed by providing the disk with an outwardly bulging circular bead extending farther inward upon its inner circle to form the shoulder and being surrounded by and joining with a circumscribing ring portion of the disk which is secured to the wheel felly by bolts. In the form of the invention herein disclosed, the disk is provided with a circular opening at its central portion, this opening being sufficiently large to receive a hub portion of the wheel with which the disk is in engagement.

A wheel embodying the preferred form of my invention employs spokes, preferably of wood, which radiate from a hub at their inner ends and are attached at their outer ends to a wheel rim or felly, and two disks between which the spokes are disposed. Before the application of the disks to the wheel they are sufficiently dished to be engageable with the wheel spokes along circular lines well within the rim or felly of the wheel and to flare away from the wheel from the places of contact of the disks with the wheel spokes. Bolts are employed to clamp the central and the felly portions of the disks and the wheel together. In this clamping operation the resiliency of the disks is overcome to bring the disks in close engagement with the wheel spokes and to engage the shoulders at the peripheries of the disks with the felly of the wheel. A wheel thus constructed is free of noisy vibration of the disks and is well adapted to previously constructed wooden wheels which are thereby strengthened or restored in strength to make them of further service if about worn out and improving them in appearance.

In accordance with one of the characteristics of my present invention, the bases of the spokes of the wheel are clamped between a hub flange and a clamping plate and the disks are clamped, one upon the outside of the hub flange and the other upon the outside of the clamping plate to conceal the hub bolts, inconspicuous bolts serving to hold the disks and hub structure together.

I will explain my invention more fully by reference to the accompanying drawing in which Figure 1 is a diametrical sectional view of a wheel embracing my invention; Fig. 2 is an outer face view of the wheel shown in Fig. 1 with parts broken away; Fig. 3 is an inner face view of the wheel; and Fig. 4 is an enlargement of part of Fig. 1.

Like parts are indicated by similar characters of reference throughout the different figures.

I have illustrated a common form of wooden spoked non-propelling automobile vehicle wheel to which my invention is applied. The wheel shown includes wooden spokes 1 having widened bases that bring adjacent ones of them in contact with each other where they immediately surround the hub 2 that is formed preferably of metal. The hub has a circular flange 3 between which and a circular clamping plate 3' the bases of the spokes are clamped by means of bolts 4. The spokes are joined, at their outer ends, with a felly 5 constituting a tire supporting wheel rim. A tire retaining rim 6 surrounds and is secured to the felly when the wheel is pneumatic. A pneumatic tire 7 is held by said tire supporting rim.

A metal disk 8 is disposed upon the inner face of the wheel, this disk being secured in place by means of bolts 9 that pass through the rim portion 5 and clamp the peripheral portion of said disk against the inner face of said rim portion. The wheel rim portion 5 has its inner circular face supported and seated upon or in snug engagement with an annular shoulder 10 which is preferably formed upon the disk 8 by producing thereon an outwardly bulging bead 11 which is concentric with the periphery of the wheel and said disk. The inner circular side of said bead is wider than its outer circular side so that the circumscribing ring like or peripheral portion of the disk that is clamped to the ring portion 5 will be in a plane that is outwardly beyond the general plane of the disk portion supporting the shoulder 10 so that the formation of a shoulder adapted to the support of the rim portion 5 illustrated is assured. The invention, however, it not to be limited to this construction for producing the shoulder which would not be required with all shapes of the rim portion 5.

Another metal disk 12 is disposed upon the wheel, this second disk being upon the outer face of the wheel, the same bolts 9 that clamp disk 8 to the periphery of the wheel rim portion 5 also performing this function upon disk 12, these bolts clamping the peripheral portion of disk 12 against the outer face of said rim portion. The wheel rim portion 5 has its inner circular face also supported and seated upon or in snug engagement with a shoulder 13 which is preferably formed upon the disk 12 by producing thereon an outwardly bulging bead 14 which is concentric with the periphery of the wheel and said disks. The inner circular side of said bead 14 is wider than its outer circular side so that the circumscribing ring like or peripheral portion of the disk 12 that is clamped to the rim portion 5 will, as in the case of disk 8, be in a plane that is outwardly beyond the general plane of the disk portion supporting the shoulder 13 so that the formation of a shoulder adapted to the support of the rim portion 5 illustrated is assured. As hitherto stated, the invention is not to be limited to this construction for producing the shoulder.

The holes in the disks 8 and 12 that receive the bolts 9 are elongated or enlarged radially of the wheel, preferably upon opposite sides of the bolts, to permit of slight movements of the disks in the plane of and with reference to the wheel. This construction avoids such rigid interrelation between the disks and the wheel structure or wheel elements interposed therebetween as would prevent slight yielding of the rim portion of the wheel with respect to the hub portion. This construction also permits the disks to yield resiliently between their peripheral portions and their central portions, particularly if the latter portions are so secured to or so engage the hub portions of the wheel as to be substantially immovable with respect thereto.

Each of the disks 8 and 12 is formed preferably of spring steel about one sixteenth of an inch in thickness. Before the application of each of the disks 8 and 12 to the wheel it is preferably generally concave or of dish form, as illustrated by dotted lines, being constrained against its own resilience to its flatter form by means of the bolts 9. The rim of the bottom of each initially dished disk is formed by means of a shoulder forming bead 16 which is concentric with the wheel and its disks, each shoulder extending inwardly beyond the portion of the disk it circumscribes to constitute the shoulder a fulcruming edge, engaging the wheel spokes 1, upon which such disk is brought from its outwardly flaring form illustrated by dotted lines to its flatter form by the action of the clamping bolts 9, the circumscribed or central disk portions being clamped to the hub of the wheel by the bolts 4' that pass through the disks into the hub portions 3, 3' to clamp the disks respectively against the outer faces of these hub portions. By this construction the disks 8 and 12 are pressed against the wheel hub structure in a manner to prevent rattling and to reinforce and strengthen the wooden portion of the wheel, the disks of my invention being applicable to worn wooden wheels as well as being of service in the formation of new wheels.

A large outwardly bulging annular swell 18, concentric with the wheel and its disks, is formed in each disk 8 and 12 near the clamping parts 3 and 3', this swell contributing to the ornate appearance of the disks and imparting a small degree of flexibility to the disks that readily permits the disks to be changed from their dish formation to their flatter formation when they are clamped in place at their central and peripheral portions. This swelling formation 18 in each disk also adds a spring or resilient quality to each disk having it and urges the annular shoulder 16 of such disk against the spokes 1 of the wheel and maintains the shoulder and these spokes in engagement during and after the flattening of such disk 9 by the bolts. These swells or enlarged beads 18 receive the conical ends of the bolts 4. They circumscribe narrow flat ring like portions of the disks through which portions the bolts 4' are passed into the hub elements 3, 3'. The disks 8 and 12 have each a central circular opening that receives the hub 2. This central opening in each disk is margined by an outwardly projecting annular bead or shoulder 19 spaced sufficiently apart from the surrounding bead 18 to form the narrow ring like disk portion through which bolts 4' pass into the hub structure. The edge portion 19 of each disk is in snug engagement with the cylindrical side of the hub 2 forming a centering device in the assembly of the disk with the wheel.

The outer disk 12 is provided with a recessed formation at which there is accessibly disposed the usual nipple 20 employed for connection with a source of air under pressure and having connection with the inner tube of the tire whereby the tire may be inflated or replenished with air under pressure. A pocket formation 21, opening outwardly, is preferably provided to receive said nipple. The pocket formation may be a separate piece of shaped sheet metal interlocked at its forward edge with the portion of the disk (12) margining the recess formed therein. The nipple and the pocketed formation receiving it are between adjacent wheel spokes (where spokes are employed) being just as accessible for manipulation as though the disks were absent.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A wheel having a tire, spokes, and a hub which has a flange and a circular clamping plate between which hub elements the inner ends of the wheel spokes are disposed, and bolts that clamp said hub elements against the spokes; in combination with a disk substantially covering a face portion of the wheel that is surrounded by the tire and formed with an outwardly bulging annular swell near the wheel hub that surrounds an annular disk portion and covers ends of the aforesaid bolts; and additional bolts for clamping the portion of the disk surrounded by said swell against one of the aforesaid hub elements, the portion of the disk surrounded by said swell itself surrounding an opening through which the hub passes.

2. A wheel having a tire, spokes, and a hub which has a flange and a circular clamping plate between which hub elements the inner ends of the wheel spokes are disposed, and bolts that clamp said hub elements against the spokes; in combination with a disk substantially covering a face portion of the wheel that is surrounded by the tire and also covering ends of the aforesaid bolts; and additional bolts for clamping the disk against one of the aforesaid hub elements.

In witness whereof, I hereunto subscribe my name this eighteenth day of November, A. D., 1919.

FREDERICK S. STAFFORD.